(12) United States Patent
Payer et al.

(10) Patent No.: US 9,448,929 B1
(45) Date of Patent: Sep. 20, 2016

(54) MEMORY ALLOCATION FOLDING BASED ON OBJECT DOMINANCE

(71) Applicant: GOOGLE INC., Mountain View, CA (US)

(72) Inventors: Hannes Payer, Munich (DE); Daniel Kenneth Clifford, Vatersletten (DE); Ben Titzer, Munich (DE); Michael Starzinger, Munich (DE)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 14/328,407

(22) Filed: Jul. 10, 2014

(51) Int. Cl.
*G06F 12/10* (2016.01)
*G06F 12/02* (2006.01)

(52) U.S. Cl.
CPC ......... *G06F 12/0253* (2013.01); *G06F 12/023* (2013.01); *G06F 2212/702* (2013.01)

(58) Field of Classification Search
CPC . G06F 12/0253; G06F 12/023; G06F 3/0608
USPC ........................................................ 711/171
See application file for complete search history.

(56) References Cited

U.S. PATENT DOCUMENTS 6,182,089 B1 * 1/2001 Ganapathy et al. ... G06F 12/023

OTHER PUBLICATIONS

Barth J. M., "Shifting Garbage Collection Overhead to Compile Time", Communications of the ACM, vol. 20, No. 7, Jul. 1977, pp. 513-518.
Dolby, Julian, "Automatic Inline Allocation of Objects", PLDI '97, NY, USA, 1997, pp. 7-17.
Dolby et al., "An Evaluation of Automatic Object Inline Allocation Techniques", OOPSLA '98, 1998, pp. 1-20.
Dolby et al., "An Automatic Object Inlining Optimization and its Evaluation", PDLI 2000, May 2000, pp. 345-357.
Veldema et al., "Object Combining: A New Aggressive Optimization for Object Intensive Programs", JGI'02, Nov. 3-5, 2002, pp. 165-174.
Zee et al., "Write Barrier Removal by Static Analysis", OOPSLA'02, Nov. 4-8, 2002, Seattle, pp. 191-210.
Guyer et al., "Finding Your Cronies: Static Analysis for Dynamic Object Colocation", OOPSLA'04, Oct. 24-28, 2004, pp. 237-250.
Vechev et al., "Write Barrier Elision for Concurrent Garbage Collectors", ISMM'04, Oct. 24-25, 2004, pp. 13-24.
Blackburn et al., "Barriers: Friend or Foe?", ISMM'04, 2004, pp. 143-151.

(Continued)

*Primary Examiner* — Jae Yu

(74) *Attorney, Agent, or Firm* — Brake Hughes Bellermann LLP

(57) ABSTRACT

A computer-implemented method for compilation of applications can include receiving a set of software instructions and traversing the set of software instructions based on a control-flow order of the set of software instructions. The traversing can include identifying a first allocation instruction in the set of software instructions, the first allocation instruction being configured to allocate a first amount of memory for a first object and identifying a second allocation instruction in the set of software instructions, the second allocation instruction being configured to allocate a second amount of memory for a second object. The method can include determining that the first allocation instruction dominates the second allocation instruction and, in response to the determining, combining the first allocation instruction and the second allocation instruction into a folded allocation instruction that allocates the first amount of memory and the second amount of memory in a single memory allocation operation.

20 Claims, 7 Drawing Sheets

(56) References Cited

OTHER PUBLICATIONS

Nandivada et al., "Compile-Time Concurrent Marking Write Barrier Removal", IEEE Computer Society, CGO'05, 12 pages.

Pizlo et al., "Path Specialization: Reducing Phased Execution Overheads", ISMM'08, Jun. 7-8, 2008, pp. 81-90.

Wimmer et al., "Automatic Feedback-Directed Object Fusing", ACM Transactions on Architecture and Code Optimization, vol. 7, No. 2, Article 7, Sep. 2010, 35 pages.

Wimmer et al., "Linear Scan Register Allocation on SSA Form", CGO'10, Apr. 24-28, 2010, pp. 170-179.

Rogers, Ian, "Reducing and Eliding Read Barriers for Concurrent Garbage Collectors", ICOOOLPS'11, Jul. 26, 2011, 5 pages.

Yang et al., "Barriers Reconsidered, Friendlier Still!", ISMM'12, Jun. 15-16, 2012, pp. 37-47.

Google Inc., "Octane", available online at <https://developers.google.com/octane/>, retrieved on Jul. 31, 2014, published 2013, 10 pages.

Google Inc., "V8", available online at <https://code.google.com/p/v8/>, retrieved on Jul. 31, 2014, 2013, 1 Page.

Ritter, Andreas, "JPEGEncoder", available online at <https://github.com/owencm/javascript-jpeg-encoder/blob/master/jpeg_encoder_basic.js>, retrieved on Jul. 31, 2014, 2009, 10 pages.

"Kraken JavaScript Benchmark Results", Content Version: Kraken-1.1, retrieved on Aug. 11, 2014 from http://krakenbenchmark.mozilla.org, 1 page.

\* cited by examiner

| D | INSTRUCTIONS |
|---|---|
|  | I1 = PARAMETER[0] |
|  | I2 = PARAMETER[1] |
|  | I3 = CONSTANT[#16] |
|  | I4 = ALLOC[young](I3) |
| I4 | I5 = STORE[a](I4, ...) |
| I4 | I6 = CONSTANT[#8] |
| I4 | I7 = ALLOC[young](I6) |
| I7 | I8 = STORE[w](I7, ...) |
| I7 | I9 = STORE[b](I4, I7) |
|  | I10 = CONSTANT[#12] |
|  | I11 = ALLOC[young](I10) |
| I11 | I12 = STORE[z](I11, ...) |
| I11 | I13 = STORE[c](I4, I11) |

FIG. 2A

| D | INSTRUCTIONS |
|---|---|
|  | I1 = PARAMETER[0] |
|  | I2 = PARAMETER[1] |
|  | N1 = CONSTANT[#36] |
|  | N2 = ALLOC[young](N1) |
| N2 | N3 = INNER[#0, #16](N2) |
| N2 | I5 = STORE[a](N2, ...) |
| N2 | N4 = INNER[#16, #8](N2) |
| N2 | I8 = STORE[w](N4, ...) |
| N2 | I9 = STORE[b](N2, N4) |
| N2 | N5 = INNER[#24, #12](N2) |
| N2 | I12 = STORE[z](N5, ...) |
| N2 | I13 = STORE[c](N2, N5) |

FIG. 2B

| ID | INSTRUCTIONS |
|---|---|
| | I1 = ALLOC* (16) |
| I1 | I2 = STORE[a] (I1,...) |
| I1 | I3 = ALLOC* (8) |
| I3 | I4 = STORE[a] (I1,I3) |
| I3 | I5 = CALL ["hello"] (print) |
| I5 | I6 = ALLOC* (24) |
| I6 | I7 = STORE [a] (I3,I6) |
| I6 | I8 = ALLOC* (8) |
| I7 | I9 = STORE [a] (I6,I8) |

| ID | INSTRUCTIONS |
|---|---|
| | N1 = ALLOC* (24) |
| N1 | N2 = INNER [#0, #16] (N1) |
| N1 | I2 = STORE[a] (N2,...) |
| N1 | N3 = INNER [#16, #8] (N1) |
| N1 | I4 = STORE[a] (N2,N3) |
| I5 | I5 = CALL ["hello"] (print) |
| | N4 = ALLOC* (32) |
| N4 | N5 = INNER [#0, #32] (N4) |
| N4 | I7 = STORE [a] (N3,N5) |
| N4 | N6 = INNER [#32,#8] (N4) |
| | I9 = STORE [a] (N5,N6) |

N1 = ENSURESPACE(36)
I1 = PARAMETER[0]
I2 = PARAMETER[1]
I3 = CONSTANT[#16]
N2 = BUMPPOINTER[young](I3)
I5 = STORE[a](N2, ....)
I6 = CONSTANT[#8]
N3 = BUMPPOINTER[young](I6)
I8 = STORE[w](N3, ....)
I9 = STORE[b](N2, N3)
I10 = CONSTANT[#12]
N4 = BUMPPOINTER[young](I10)
I12 = STORE[z](N4, ....)
I13 = STORE[c](N2, N4)

FIG. 4

MEMORY ALLOCATION FOLDING BASED ON OBJECT DOMINANCE

TECHNICAL FIELD

This disclosure relates to compilation of software applications. More specifically, this disclosure relates to approaches for folding (grouping) memory allocation operations at compile-time to reduce memory allocation overhead and eliminate write barriers at run-time.

BACKGROUND

Software applications that rely on automatic memory management are becoming more and more prevalent. Such applications may be implemented as traditional consumer desktop applications, in large scale data analysis computing systems, on high-performance web servers, on financial trading platforms, and can be included in ever-more demanding (e.g., memory intensive) websites. Such applications are even available for use on the billions of mobile phones that exist world-wide, as well as for implementation by embedded computing devices. Accordingly, reducing the costs (e.g., performance costs) of automatic memory management is of principal importance in best utilizing computing resources across the entire spectrum of available devices, and for achieving improved application throughput (performance), so as to improve the experience of users of such applications.

Many automatic memory management systems utilize garbage collection, such as may be implemented using generational garbage collectors, to remove memory objects that are no longer needed (e.g., outdated objects) by a given application, as part of managing memory that is assigned to the application by a computing device on which the application (program) is executing (running). Garbage collection can also be used to defragment a block of memory that is associated with a given program. Such a defragmentation process can group (move) live (active) memory objects together in memory and, as a result, free up larger blocks (sections, chunks, etc.) of available (free, unassigned, and so forth) memory space by eliminating portions of free memory that located between live objects (fragmented memory). These portions of unused (fragmented) memory may, for instance, be associated with objects that are no longer being used by the given application.

Garbage collection, however, can introduce some overhead in the associated application's main execution path. While some garbage collection work can be done incrementally, in parallel with the application, or even concurrently with the application, the cost of executing (memory) allocation operations (which may be referred to as allocation overhead) and write barriers still remain. This is even more apparent in garbage collectors that target low pause time (e.g., where garbage collection does affect user perception of performance during application execution) and require heavier write barriers (e.g., write barriers implemented with a relatively large number instructions, such as more than five instructions).

Such write barriers are generally emitted inline in compiled code (e.g., a set of software instructions) and, for implementations using generational garbage collection, are used to track inter-generational pointers (e.g., references from "old generation" objects to "young generation" objects). Such inter-generational pointers may need to be updated if a "young generation" object gets moved during a garbage collection process, in order to maintain its relationship with its associated "old generation" object or objects. Reducing the overhead associated with memory allocation operations (which can trigger garbage collection) and write barriers (which can be associated with an allocation instruction, a move instruction, a procedure call, a store instruction, or any other instruction in which references between memory objects can be changed) is desirable, as such reductions may provide improvements in throughput (performance) of an associated application.

SUMMARY

According to one general aspect, a computer-implemented method for compilation of applications can include receiving, by a software compiler implemented on a computing device, a set of software instructions and traversing, by the software compiler, the set of software instructions based on a control-flow order of the set of software instructions. The traversing can include identifying a first allocation instruction in the set of software instructions, the first allocation instruction being configured to allocate a first amount of memory for a first object and identifying a second allocation instruction in the set of software instructions, the second allocation instruction being configured to allocate a second amount of memory for a second object. The computer-implemented method can further include determining that the first allocation instruction dominates the second allocation instruction and in response to the determining, combining the first allocation instruction and the second allocation instruction into a folded allocation instruction that is configured to allocate the first amount of memory and the second amount of memory in a single memory allocation operation.

Example implementations can include one or more of the following features. For instance, the computer-implemented method can include replacing the second allocation instruction with an instruction to define the second object in the memory of the single memory allocation operation. The instruction to define the second object can be an INNER instruction that is configured to define the second object in a block of memory corresponding with the single memory allocation.

The traversing can include identifying a third allocation instruction in the set of software instructions, the third allocation instruction being configured to allocate a third amount of memory for a third object, where the method can include determining that the first allocation instruction dominates the third allocation instruction. In response to the determining that the first allocation instruction dominates the third allocation instruction, the combining can include combining the third allocation instruction with the first allocation instruction and the second allocation instruction in the folded allocation instruction. The folded allocation instruction can be configured to allocate the third amount of memory in the single memory allocation operation. The computer-implemented method can include replacing the third allocation instruction with an instruction to define the third object in the memory of the single memory allocation operation. The single memory allocation operation can allocate the first amount of memory, the second amount of memory and the third amount of memory in a contiguous memory block.

The first allocation instruction, the second allocation instruction and the third allocation instruction can be included in a single block of sequential code. The first allocation instruction can be included in a first block of sequential code, the second allocation instruction can included in a second block of sequential code that is sequential with the first block of sequential code and the third allocation instruction can be included in a third block of sequential code that is sequential with the first block of sequential code and parallel with the second block of sequential code.

The traversing can include identifying a fourth allocation instruction in the set of software instructions, the fourth allocation instruction being configured to allocate a fourth amount of memory for a fourth object. The method can include determining that the first allocation instruction dominates the fourth allocation instruction. In response to the determining that the first allocation instruction dominates the fourth allocation instruction, the combining can include combining the fourth allocation instruction with the first allocation instruction, the second allocation instruction and the third allocation instruction in the folded allocation instruction, where the folded allocation instruction can be further configured to allocate the fourth amount of memory in the single memory allocation operation.

The first allocation instruction can be included in a first block of sequential code, the second allocation instruction can be included in a second block of sequential code that is sequential with the first block of sequential code, the third allocation instruction can be included in a third block of sequential code that is sequential with the first block of sequential code and parallel with the second block of sequential code and the fourth allocation instruction can be included in a fourth block of sequential code that is sequential with the second block of sequential code and sequential with the third block of sequential code. The computer-implemented method can include replacing the fourth allocation instruction with an instruction to define the fourth object in the memory of the single memory allocation operation.

The single memory allocation operation can allocate the first amount of memory and the second amount of memory in a contiguous memory block. The computer-implemented method can include replacing the first allocation instruction with an instruction to define the first object in the memory of the single memory allocation operation. The folded allocation instruction can be a first folded allocation instruction and the single memory allocation operation can be a first single memory allocation operation, where the traversing can include identifying a third allocation instruction in the set of software instructions The third allocation instruction can be configured to allocate a third amount of memory for a third object. The computer-implemented method can include identifying a fourth allocation instruction in the set of software instructions. The fourth allocation instruction can be configured to allocate a fourth amount of memory for a fourth object. The computer-implemented method can include determining that the first allocation instruction does not dominate the third allocation instruction, determining that the third allocation instruction dominates the fourth allocation instruction and, in response to the determining that the third allocation instruction dominates the fourth allocation instruction, combining the third allocation instruction with the fourth allocation instruction in a second folded allocation instruction, the second folded allocation instruction being configured to allocate the third amount of memory and the fourth amount of memory in a second single memory allocation operation.

In another general aspect, a computer-implemented method can include receiving, by a software compiler implemented on a computing device, a set of software instructions and traversing, by the software compiler, the set of software instructions based on a control-flow order of the set of software instructions. The traversing can include identifying a first allocation instruction in the set of software instructions, the first allocation instruction being configured to allocate a first amount of memory for a first object, and identifying a second allocation instruction in the set of software instructions, the second allocation instruction being configured to allocate a second amount of memory for a second object. The method can also include determining that the first allocation instruction dominates the second allocation instruction and, in response to the determining, can include inserting, in the set of software instructions, an instruction before the first allocation instruction. The inserted instruction can be configured to determine if a contiguous memory block of sufficient size to allocate the first amount of memory and the second amount of memory is available and, if the contiguous memory block of sufficient size is not available, trigger garbage collection. The computer-implemented method can also include replacing the first allocation instruction with an instruction configured to allocate the first amount of memory in the contiguous memory block and replacing the second allocation instruction with an instruction configured to allocate the second amount of memory in the contiguous memory block.

Example implementations can included one or more of the following features. For instance, the traversing can include identifying a third allocation instruction in the set of software instructions, the third allocation instruction being configured to allocate a third amount of memory for a third object. The determining that the first allocation instruction dominates the second allocation instruction can include determining that the first allocation instruction dominates the third allocation instruction. The determining if the contiguous memory block of sufficient size is available can include determining if a contiguous memory block of sufficient size to allocate the first amount of memory, the second amount of memory and the third amount of memory is available. The computer-implemented method can include replacing the third allocation instruction with an instruction configured to allocate the third amount of memory in the contiguous memory block.

In another general aspect a non-transitory recordable storage medium can have instructions recorded and stored thereon for implementing a software compiler, the instructions, when executed by a computing device, can cause the computing device to receive a set of software instructions and traverse the set of software instructions based on a control-flow order of the set of software instructions. The traversing can include identifying a first allocation instruction in the set of software instructions, the first allocation instruction being configured to allocate a first amount of memory for a first object, and identifying a second allocation instruction in the set of software instructions, the second allocation instruction being configured to allocate a second amount of memory for a second object. The instructions, when executed by the computing device, can also cause the computing device to determine that the first allocation instruction dominates the second allocation instruction and, in response to the determining, combine the first allocation instruction and the second allocation instruction into a folded allocation instruction that is configured to allocate the first amount of memory and the second amount of memory in a single memory allocation operation.

Example implementations can include one or more of the following features. For instance, the instructions, when executed by the computing device, can further cause the computing device to identify a third allocation instruction in the set of software instructions, the third allocation instruction being configured to allocate a third amount of memory for a third object and determine that the first allocation instruction dominates the third allocation instruction. In response to the determining that the first allocation instruction dominates the third allocation instruction, the combining can include combining the third allocation instruction with the first allocation instruction and the second allocation instruction in the folded allocation instruction, the folded allocation instruction being configured to allocate the third amount of memory in the single memory allocation operation.

The folded allocation instruction can be a first folded allocation instruction and the single memory allocation operation can be a first single memory allocation operation. The instructions, when executed by the computing device, can cause the computing device to identify a third allocation instruction in the set of software instructions, the third allocation instruction being configured to allocate a third amount of memory for a third object, identify a fourth allocation instruction in the set of software instructions, the fourth allocation instruction being configured to allocate a fourth amount of memory for a fourth object, determine that the first allocation instruction does not dominate the third allocation instruction, determine that the third allocation instruction dominates the fourth allocation instruction, and, in response to the determining that the third allocation instruction dominates the fourth allocation instruction, combine the third allocation instruction with the fourth allocation instruction in a second folded allocation instruction, the second folded allocation instruction being configured to allocate the third amount of memory and the fourth amount of memory in a second single memory allocation operation.

In another general aspect, a non-transitory recordable storage medium can have instructions recorded and stored thereon for implementing a software compiler, the instructions, when executed by a computing device, can cause the computing device to receive a set of software instructions and traverse the set of software instructions based on a control-flow order of the set of software instructions. The traversing can include identifying a first allocation instruction in the set of software instructions, the first allocation instruction being configured to allocate a first amount of memory for a first object and identifying a second allocation instruction in the set of software instructions, the second allocation instruction being configured to allocate a second amount of memory for a second object. The instructions, when executed by the computing device, can further cause the computing device to determine that the first allocation instruction dominates the second allocation instruction and, in response to the determining, insert, in the set of software instructions, an instruction before the first allocation instruction, the inserted instruction being configured to determine if a contiguous memory block of sufficient size to allocate the first amount of memory and the second amount of memory is available and, if the contiguous memory block of sufficient size is not available, trigger garbage collection. The instructions, when executed by a computing device, can further cause the computing device to replace the first allocation instruction with an instruction configured to allocate the first amount of memory in the contiguous memory block and replace the second allocation instruction with an instruction configured to allocate the second amount of memory in the contiguous memory block.

The details of one or more implementations are set forth in the accompanying drawings and the description below. Other features will be apparent from the description and drawings, and from the claims.

BRIEF DESCRIPTION OF THE DRAWINGS

FIGS. 2A and 2B are corresponding listings of sets of software instructions, respectively before and after compilation with allocation folding, according to an implementation.

FIG. 4 is a listing of a set of software instructions corresponding with the set of software instructions of FIG. 2A after compilation that includes adding a memory pre-allocation instruction and inserting non-write barrier memory allocation instructions, according to an implementation.

Like reference symbols in the various drawings indicate like elements.

DETAILED DESCRIPTION

Figure 1:
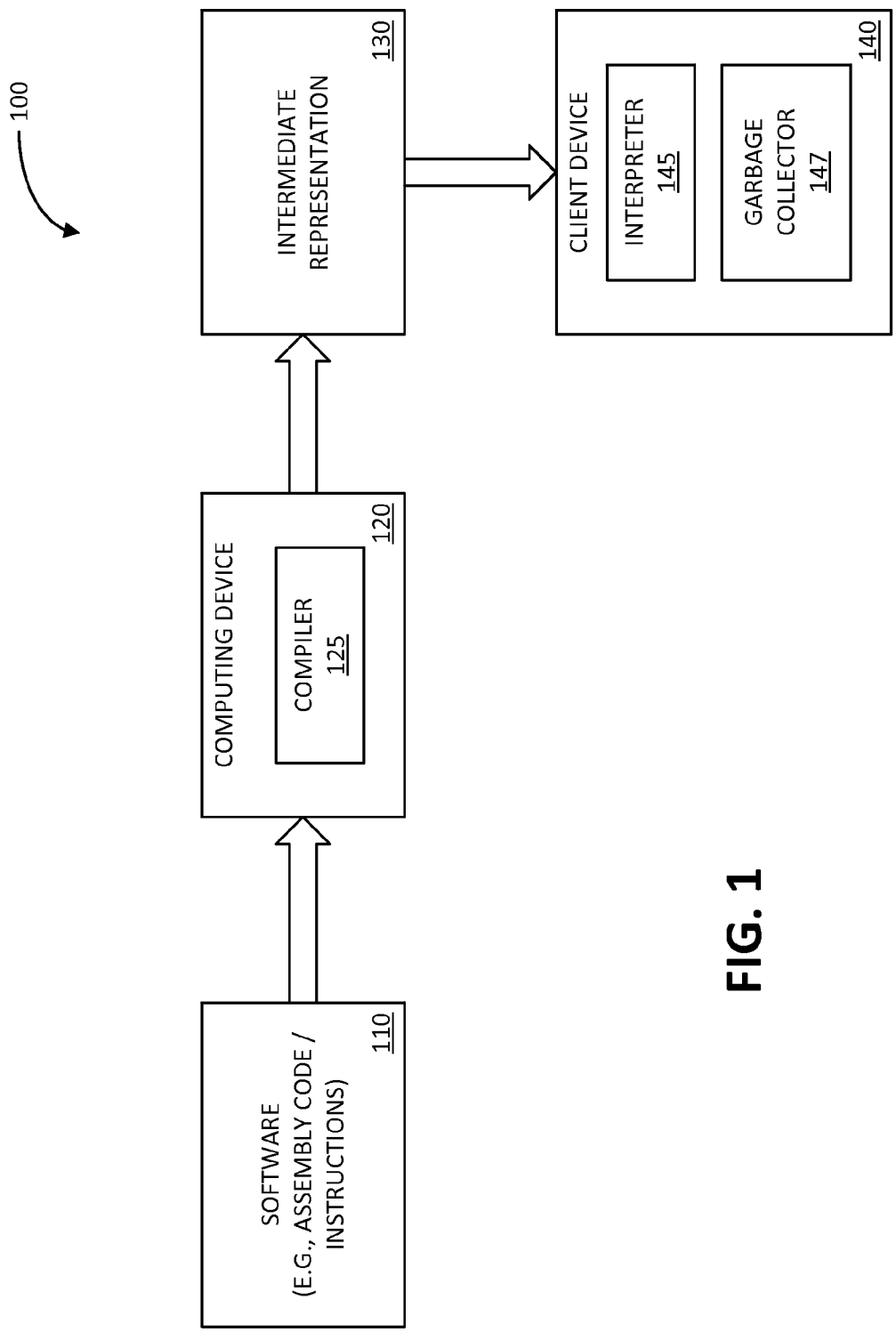
FIG. 1 is a block diagram illustrating an approach for compilation of software applications, according to an implementation.

FIG. 1 is a diagram illustrating a system 100 that may be used for compiling software applications (e.g., sets of software instructions), according to an implementation. As illustrated in FIG. 1, software 110, which may include a set of assembly code instructions, or the like, may be provided to a computing device 120 that includes a compiler 125. The compiler 125 may convert the software to machine code, which can be directly executed by the computing device 120, or other device (e.g., client device 140). In other implementations, the compiler 125 can convert the software 125 to an intermediate representation (IR) 130 that is expressed by a programming language, for example, Java, JavaScript, or other such programming languages.

As shown in FIG. 1, the IR 130 (or compiled machine code in other implementations) can be provided to a client device 140 for execution. The client device 140 could be a number of different types of devices, such as a laptop computer, a server, a computing mobile device, such as a smartphone, an embedded computing device, etc. In one approach, the client device 140 can directly execute compiled code (e.g., if the code is compiled to a machine language that is executable on the client device 140). In other implementations, such as in the system 100, the client device 140 may include an interpreter 145 (e.g., a JavaScript interpreter) that is configured to execute the IR 130 in a virtual machine (VM) environment, such as from within a web browser.

For purposes of clarity and illustration, in the following discussion, the executable version of the software 110 that is provided to the client device 140 will be referred to as the IR 130. It will be appreciated, however, that an executable version of the software 110 may be provided to the client device 140 in other forms, such as in the form of machine code, for example. In still other implementations, a set of uncompiled instructions may be provided to the client device 140 and the client device 140 may include a compiler, such as the compiler 125, and/or a compiler such as those described herein.

The client device 140 may also include a garbage collector 147 that is configured to manage memory objects in memory (e.g., random-access memory, flash memory and so forth) during execution of the IR 130 (e.g., using the interpreter 145). In an implementation, an operating system (OS) of the client device 140 may dedicate (assign or allocate) a given amount of memory for use by the IR 130 when it is executing. The amount of memory dedicated by the OS, and the process by which that memory is allocated can vary based on the specific implementation. The garbage collector 147 may operate in concert with (e.g., in cooperation with, in conjunction with, or as part of) the IR 130 to manage the section(s) (chunk or chunks) of memory that is (are) assigned to the IR 130 by the OS of the client device 140 during execution of the IR 130. For example, the garbage collector 147 may remove memory objects that are no longer needed, or outdated, as well as defragment the assigned memory so as to group live objects together in memory and, as a result, make larger contiguous chunks of free memory available to the IR 130 for allocation of memory objects by the IR 130.

The garbage collector 147 may be implemented as a generational garbage collector, though other types of garbage collectors may be used. The garbage collector 147 can use a semi-space strategy that classifies objects as "young generation" objects, which have not yet been observed and/or moved by the garbage collector 147, and "old generation" objects, which have been previously observed and/or moved by the garbage collector. In such approaches, the garbage collector 147 can be configured to perform frequent minor collections of the young generation objects, and may also implement a mark-and-sweep collector with incremental marking for major collections of the old generation objects.

In such implementations, write barriers can be emitted inline in compiled code to track inter-generational pointers and maintain consistency of those pointers (e.g., in the event a young generation object gets moved. Write barriers can also be emitted to maintain a marking invariant, such as to prevent objects that have been fully scanned by a garbage collector (e.g., the garbage collector is aware of all references to other objects in the scanned objects) do not reference objects that have not been scanned by the garbage collector, or of which the garbage collector is unaware. For such approaches, every store into an object on a garbage collected heap may require (emit) a write barrier, unless the compiler can prove the barrier to be redundant and/or unnecessary.

Write barriers can serve multiple purposes, or accomplish multiple tasks when executing software applications. Three such tasks (purposes) can be tracking of inter-generational pointers, maintaining the marking invariant noted above and maintaining pointers to "evacuation candidates." Performance of these tasks can ensure correct behavior of a garbage collector while a given software application is executing (e.g., the garbage collector moves memory objects being used by the application during its execution) and objects on the garbage collected heap are accessed during execution of the given software application.

Inter-generational pointers can be tracked by recording, e.g., in a buffer, references stored in the old generation objects that point to objects in the young generation. This buffer can then become part of a root-set for minor collections, which can allow the garbage collector to perform a minor collection without considering an entire memory heap (e.g., all of the memory assigned to a given application). Every mutation of an object in the old generation potentially introduces an old-to-young reference and therefore can cause a write barrier to be emitted.

Conditions under which write barriers are emitted, such as those noted above, can be enforced during the marking phase of a major garbage collection through the use of a marking scheme that gives each memory object one of three colors: white for objects that have not yet seen (observed) by the garbage collector, gray for objects seen (observed) but not yet scanned by the garbage collector, and black for objects fully scanned by the garbage collector. Said in another way, the marking invariant is that black objects cannot reference white objects. To reduce the pause time of major collections, a garbage collector (such as the garbage collector 147) can interleave the marking phase with application execution and perform stepwise incremental marking until the transitive closure of all reachable objects has been found. Each write barrier should maintain the marking invariant for objects in the old generation, since every mutation of an object in the old generation could potentially introduce a black-to-white reference. Newly allocated objects are guaranteed to be white and, therefore, cannot violate the marking invariant.

To reduce fragmentation of certain regions of the memory heap, a garbage collector can mark fragmented pages as evacuation candidates before the marking phase starts. Memory objects on these pages may then be relocated to other, less fragmented pages, freeing the evacuated pages. The marking phase can record all references pointing into these evacuation candidates in a buffer, so that references can be updated once a target object has been relocated (evacuated). As noted above, objects in the young generation are fully scanned during a major collection and their references don't need to be recorded explicitly. Every mutation of an object in the old generation potentially introduces a reference pointing to an evacuation candidate.

The above three tasks associated with write barriers can be achieved by splitting each write barrier into two parts: one that is emitted in-line with the compiled code, and an out-of-line code stub. For example, after the compiled code performs a store to a field, an associated write barrier can first check whether the referenced object is situated on a page where values are considered interesting (e.g., objects may move). The write barrier can then check whether the receiver object (of the store operation) is situated on a page whose fields are considered interesting. These checks can be performed using bit mask tests of the page flags for the memory pages on which the respective objects are situated (located, stored). The code stubs that record the store may only be called in a case where both of the checks discussed above succeed. A write barrier can be removed if the compiler can statically determine that at least one of the checks will always fail.

As just noted, under some conditions, it may be possible to statically remove write barriers when compiling code. For instance, stores whose receiver object is guaranteed to be newly allocated in the young generation never need to be recorded, as such stores cannot introduce old-to-young references. Further, the fields of such newly allocated objects (white objects) will be updated automatically in case they point into evacuation candidates. However, this approach to write barrier elimination is limited in that it can only remove write barriers for the most recently allocated young generation object. Further elimination of write barriers can be achieved through a process of allocation folding, which creates one or more allocation groups at compile time when generating, for example, the IR 130 for execution by the interpreter 145 (or when generating compiled machine code for execution by a computing device). While specific examples of allocation folding are described herein, the techniques for allocation folding discussed can be used in connection with a number of different programming languages and or virtual machine implementations.

Allocation folding (which can be implemented at compile time or, alternatively, could be implemented at run time in some embodiments) groups multiple memory allocations together into a single chunk of memory (e.g., combines multiple memory allocation operations into a single (folded) memory allocation group operation) when it is safe to do so without being observable to a garbage collector, such as the garbage collector 147. In certain embodiments, this can be accomplished by replacing some (or all) allocation (AL-LOC) instructions with a single folded ALLOC instruction that allocates a block of memory for a corresponding allocation group (e.g., where the size of the memory block for the allocation group equals the sum of the sizes of the folded ALLOC instructions). In such approaches, the individual ALLOC instructions that are folded into the allocation group can be replaced by INNER instructions (e.g., based on "dominance" relationships between the folded ALLOC instructions). The INNER instructions can define the individual memory objects within the memory (block) of the allocation group.

For instance, a given ALLOC instruction in a set of software instructions "dominates" a subsequent ALLOC instruction if there are no intervening operations that can move the object (e.g., as a result of triggering garbage collection) allocated by the given (first) ALLOC instruction. In this situation, the dominant (dominator) ALLOC instruction and the ALLOC instruction or instructions that are dominated by the dominator can be folded. For instance, if a first ALLOC instruction dominates a second ALLOC instruction, as described above, and the second ALLOC instruction dominates a third ALLOC instruction, then the first ALLOC instruction also dominates the third ALLOC instruction and all three ALLOC instructions are candidates for folding into a single, folded ALLOC instruction. The number of ALLOC instructions that can be folded together can vary and will depend, at least, on the particular set of software instructions being compiled.

In such an approach the folded ALLOC instruction (e.g., that replaces the folded ALLOC instructions) can allocate a contiguous chunk of memory of a given size that corresponds with a sum of the respective allocation sizes of the folded ALLOC instructions, and also perform a garbage collection, if necessary, to obtain a chunk of memory of the given size. Further in such approaches, INNER instructions (that can be used to replace dominated ALLOC instructions, as well as the dominant ALLOC instruction) compute the respective effective address of a sub-region within a previously allocated chunk of memory (e.g., a chunk of memory allocated by the folded ALLOC instruction). Because objects in a folded ALLOC instruction would not have been previously observable by the garbage collector 147, such an approach has no side-effects (i.e., cannot introduce old-to-young generation references) and allows for write barriers associated with the dominated ALLOC instructions (e.g., as a result of STORE instructions to the respective allocated memory objects) to be eliminated.

In certain compilers, when candidates for allocation folding are identified in a set of software instructions (e.g., assembly code instructions), allocation folding may be accomplished by a local transformation of the compiled code. For example, if allocation $A_1$=ALLOC[s](K1) dominates allocation $A_2$=ALLOC[s](K2), then a single, folded ALLOC instruction $A_{new}$=ALLOC[s](K1+K2) can be inserted immediately before $A_1$, and the ALLOC instruction $A_1$ can be replaced with $A_1'$=INNER[#0; K1]($A_{new}$) and $A_2$ can be replaced with $A_2'$=INNER[K1; K2]($A_{new}$).

FIGS. 2A and 2B are corresponding, respective listing of sets of software instructions (200 and 250), before and after compilation with allocation folding, according to an implementation. The set of instructions 200 of FIG. 2A illustrates a control flow graph before allocation folding has been performed and the set of instructions 250 of FIG. 2B illustrates the same control flow graph after compilation with allocation folding has been performed. In FIGS. 2A and 2B, the dominator of each instruction pre-allocation folding (FIG. 2A) and post-allocation folding (FIG. 2B) is shown in the column with the heading "D."

As shown in FIG. 2A, the set of instructions 200 includes three ALLOC instructions, I4, I7 and I11. As may be seen, each of these ALLOC instructions changes the dominator for the set of instructions, as shown in column D, because the ALLOC instructions may trigger garbage collection and result in previously allocated objects being moved, which could violate the marking invariant or violate pointer consistency (e.g., because one or more young generation objects get moved), as were described above. For example, instructions I5, I6 and I7 are shown as being dominated by instruction I4, while instructions I8 and I9 are dominated by I7, as the ALLOC of instruction I7 could trigger garbage collection and mutate the object previously allocated at instruction I4, thus violating the marking invariant discussed above.

As illustrated in FIG. 2A, some instructions, such as I10 and I11, of the set of instructions 200 do not have a dominator. In the set of instructions 200 of FIG. 2B, some, but not all, write barriers can be eliminated through local, static analysis. For instance, the write barriers associated with the STORE instructions I8, and I12 can be eliminated, since the pre-allocation folding dominator of those instructions are the respective receivers of their STORE operations, and those receivers are allocations in the young generation. Therefore, stores of instructions I8 and I12 cannot violate the marking invariant.

In comparison, however, the write barriers associated with the STORE instructions I9 and I13 cannot be statically eliminated because their pre-allocation folding dominator does not match the receiver object of their respective STORE instructions. These write barriers (for instructions I9 and I13) can, however, be eliminated using allocation folding, such as described below.

As noted above, the set of instructions 250 of FIG. 2B shows the control flow graph of FIG. 2A after compilation with allocation folding has been performed (such as by the compiler 125). In the set of instructions 250, some of the instructions from the set of instructions 200 have been removed, and new instructions Nn have been inserted. For example, the ALLOC instructions I4, I7 and I11 of the set of instructions 200 have been folded into one ALLOC instruction N2 in FIG. 2B. Further, the ALLOC instructions I4, I7 and I11 of FIG. 2A have been replaced by INNER instructions N3, N4 and N5 in FIG. 2B. These INNER instructions are configured to carve out define (carve out) the individual memory objects associated with the ALLOC instructions I4, I7 and I11 in FIG. 2A from the memory of the allocation group of that is allocated by the folded ALLOC instruction N2 in FIG. 2B.

Removing these ALLOC instructions (I4, I7 and I11) removes their dominance on subsequent instructions because INNER instructions do not trigger garbage collection and, therefore, cannot violate the marking invariant or violate pointer consistency, as were described above. Accordingly, by replacing ALLOC instructions with INNER instructions, such as illustrated by FIGS. 2A and 2B, the number of points in a program (application) at which garbage collection can happen is reduced. This reduction in garbage collection triggers increases the opportunities for local write barrier elimination and reduces run time overhead for allocation operations, write barriers and garbage collection.

After the allocation folding illustrated by FIGS. 2A and 2B is performed, the folded ALLOC instruction N2 dominates all the stores in the set of instructions 250 shown in FIG. 2B, as shown in column D of FIG. 2B. In other words, after allocation folding, all stores in this example are now made into objects that are allocated from a same, single allocation group ALLOC instruction, which is allocated in the young generation. Since we know that stores into objects in the young generation cannot introduce old-to-young references, write barriers for the ALLOC instructions I7 and I11 (replaced by the INNER instructions N4 and N5) can be eliminated.

Figures 3A, 3B:
FIGS. 3A and 3B are other corresponding, respective listings of sets of software instructions before and after compilation with allocation folding, according to an implementation.

FIGS. 3A and 3B are other corresponding, respective listings of sets of software instructions 300 and 350, before and after compilation with allocation folding, according to an implementation. As with FIGS. 2A and 2B, the dominator for each instruction is shown in the respective columns D of FIGS. 3A and 3B. As shown in FIG. 3A, the set of instructions 300 includes four ALLOC instructions I1, I3, I6 and I8. There are also four STORE instructions I2, I4, I7 and I9. Writer barriers for the STORE instructions I2, I4, I7 and I9 cannot be statically eliminated because, as was discussed above, their pre-allocation folding dominators (shown in column D of FIG. 2A) do not match their receiver objects.

As illustrated in FIG. 3A, the set of instructions 300 (and the corresponding set of instructions 350 of FIG. 3B after allocation folding) include a CALL instruction to a print function. Because it is difficult (or impossible), at compile time, to determine what side effects a CALL instruction may have on memory objects (e.g., a young object being moved), CALL instructions are not candidates for folding and will terminate the dominance of any proceeding ALLOC instruction when applying allocation folding. Other types of instructions may also terminate the dominance of a previous ALLOC instruction and include any instructions that could move an earlier allocated young generation memory object.

Accordingly, as shown by the set of instructions 350 of FIG. 3B, the ALLOC instructions I1 and I3 of FIG. 2A can be folded into a new ALLOC instruction N1 of FIG. 3B. As noted above, the size of the memory allocation of the folded ALLOC instruction N1 is equal to the sum of the size of the memory allocations of ALLOC instructions I1 and I3. As was discussed with respect to the allocation folding in FIGS. 2A and 2B, the ALLOC instructions I1 and I3 of FIG. 3A can be replaced by the INNER instructions N2 and N3 of FIG. 3B, which define (carve out) the memory objects associated with ALLOC instructions I1 and I2 from the folded memory allocation of N1. As is shown in column D in FIG. 3B, after allocation folding, the ALLOC instruction N1 is the dominator of the STORE instructions I2 and I4, and that dominance is terminated by the CALL instruction I5.

As with the ALLOC instructions I1 and I3 of FIG. 2A, the ALLOC instructions I6 and I8 of FIG. 2A can be folded into a new ALLOC instruction N4 of FIG. 3B. Again, the size of the memory allocation of the folded ALLOC instruction N4 is equal to the sum of the size of the memory allocations of ALLOC instructions I6 and I8 that are folded into the ALLOC instruction N4. Further, the ALLOC instructions I6 and I8 of FIG. 3A can be replaced by the INNER instructions N5 and N6 of FIG. 3B, which define (carve out) the memory objects associated with ALLOC instructions I6 and I8 from the folded memory allocation of N4. As is shown in column D in FIG. 3B, after allocation folding, the ALLOC instruction N4 is the dominator of the STORE instructions I7 and I9.

FIG. 4 is a listing of a set of software instructions 400 corresponding with the set of software instructions 200 of FIG. 2A, after compilation including adding a memory pre-allocation instruction and inserting non-write barrier emitting memory allocation instructions, according to an implementation. Such a process can be referred to as dynamic allocation folding. In the set of instructions 400, a new instruction N1=ENSURESPACE(36) is added at the beginning of the set of instructions 200 of FIG. 2A. The syntax of the ENSURESPACE instruction is given by way of example and for purposes of illustration. The syntax and parameters of such an instruction may vary based on the specific implementation.

In this example, the ENSURESPACE instruction may examine the memory heap (chunk of assigned memory) for a given application to determine if a contiguous block of memory of the specified size is available. In this instance, the specified size is 36 words, which is the sum of the sizes of the three ALLOC instructions I4 (16 words), I7 (8 words) and I11 (12 words) in FIG. 2A.

At run time for the set of instructions 400, if a sufficient size block of memory (36 words) is available, the ENSURESPACE instruction can complete and execution may proceed to instruction I1. If, however, a contiguous block of memory of sufficient size (e.g., 36 words) is not available, the ENSURESPACE instruction can trigger garbage collection in order remove unneeded memory objects and defragment the memory heap in order to free memory for the ALLOC instructions in the set of instructions 400. In such an approach, dominance/dominator relationships can be determined in like manner as discussed herein, such as with respect to FIGS. 2A, 2B, 3A and 3B.

Accordingly, because the ALLOC instruction I4 of FIG. 2B (e.g., using the analysis described herein for determining dominance for purposes of allocation folding), is the dominator of each of the subsequent store instructions in the set of instructions 200 (e.g., because the marking invariant for dominance is met and pointer consistency is not violated), write barriers can be eliminated for ALLOC instructions I4, I7 and I11 of FIG. 2A once the ENSURESPACE instruction has determined that a contiguous block of memory of sufficient size (i.e., 36 words in this example) is available, or is made available through a garbage collection process.

Therefore, in this example, the ALLOC instructions I4, I7 and I11 of FIG. 2A can be replaced with non-write barrier emitting BUMPPOINTER instructions N2, N3 and N4 of FIG. 4, which, because each of the corresponding allocations is a young generation object, will allocate (define or carve out) their corresponding memory objects in the contiguous block of memory identified, or made available by the ENSURESPACE instruction without violating the marking invariant for dominance or causing any young generation objects to move (as a result of a garbage collection). In some implementations, the ENSURESPACE instruction can be inserted just prior to the first BUMPPOINTER instruction N2.

Figure 5A:
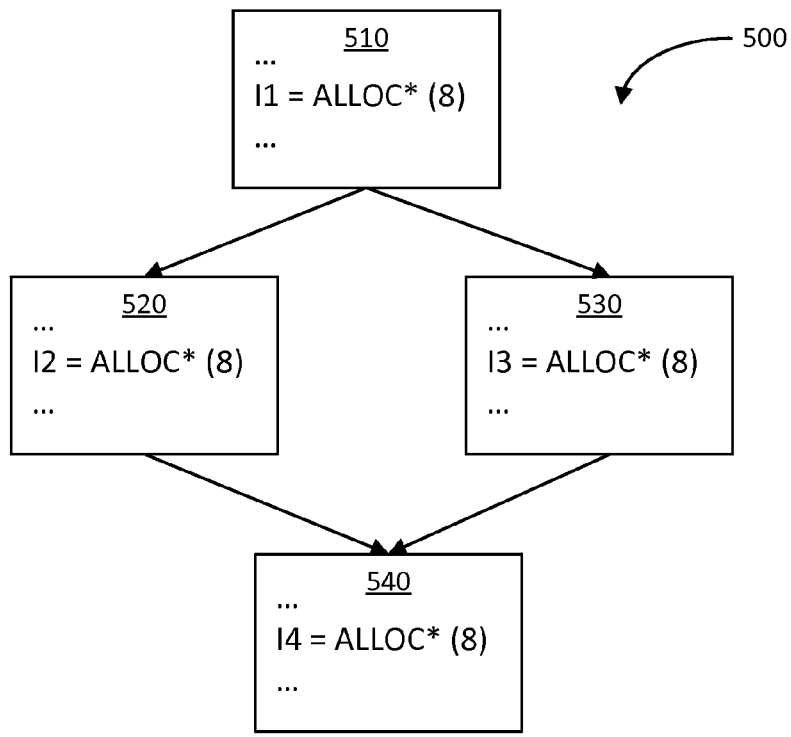
FIGS. 5A-5C are block diagrams the illustrate allocation folding (e.g., as shown in FIGS. 2A-4) over basic blocks, such as a may be applied to branched code, according to an implementation.
Figure 5B:
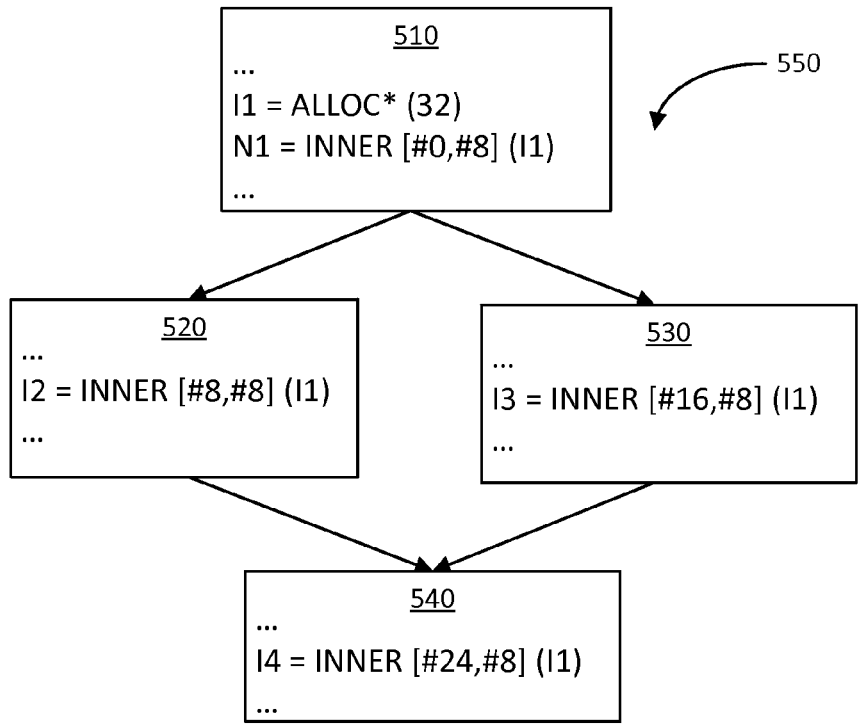
Figure 5C:
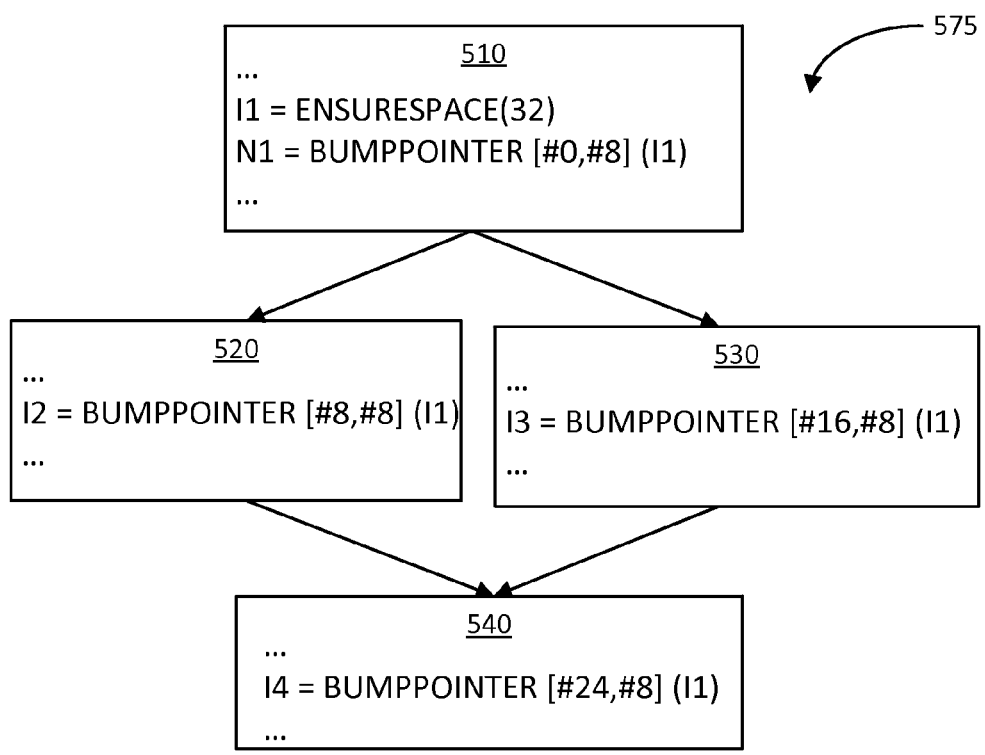

FIGS. 5A-5C are diagrams 500, 550 and 575 that illustrate allocation folding over basic blocks, such as can be applied to branched code, according to an implementation. The foregoing examples of allocation folding (e.g., FIGS. 2A, 2B, 3A and 3B) and pre-memory allocation (FIG. 4) have been described with respect to basic blocks (sequential blocks) of code. However, the approaches described in those examples can also be applied over basic blocks, such as in branched code. Examples of such approaches are illustrated by FIGS. 5A-5C.

FIG. 5A illustrates, in the diagram 500, a schematic representation of branched code that includes four basic (sequential code) blocks 510, 520, 530, 540. As shown in FIGS. 5A and 5B, the code of diagrams 500 and 550 can begin with basic block 510 and, from there, branch to either basic block 520 or basic block 530. The code, regardless of which branch was taken from basic block 510, then proceeds to basic block 540 (from basic block 520 or 530, depending on the branch taken from basic block 510). The structure of the code in FIGS. 5A and 5B (and FIG. 4C) is, of course, given by way of example and the specific structure and architecture of a given (software) application (or given code) can depend on the specific implementation and/or application.

As seen in FIG. 5A, each of the basic blocks 510-540 includes an ALLOC instruction, respectively ALLOC instructions I1, I2, I3 and I4. Presuming, for purposes of this example, that the marking invariant for allocation folding is not violated between any of these four ALLOC instructions (e.g., the ALLOC instruction I1 would be the dominator of ALLOC instructions I2, I3 and I4), and that pointer consistency will not be violated, they may be folded into a single allocation instruction N1, as shown in basic block 510 in FIG. 5B. As shown in the diagram 550 of FIG. 5B, the size of the ALLOC instruction N1 is equal to the sum of the sizes of the ALLOC instructions I1, I2, I2, I4. Further, as illustrated in FIG. 5B, the ALLOC instructions I1, I2, I2, I4 can be replaced by respective INNER instructions N2, N3, N4 and N5. In other implementations, if a marking invariant for dominance is violated between any two ALLOC instructions or pointer consistency could be violated, multiple allocation foldings (or memory pre-allocations) may be implemented using local transformation of the compiled code (set of software instructions) using the techniques described herein.

In the example of FIGS. 5A and 5B, it can be observed that allocation folding over basic blocks (e.g., for branched code) can result in some amount of memory fragmentation. For instance, if at runtime, the code of diagram 550 follows the path from basic block 510 to basic block 530 and then to basic block 540, the space reserved for the INNER instructions N3 in basic block 520 will have been previously allocated (by the ALLOC instruction N1 in basic block 510) but not be used (defined), because the space reserved for such folded memory allocations does not overlap. One approach to avoid this type of memory fragmentation that can result from allocation folding, is to only fold memory allocations within the same basic block. However, depending on the specific implementation, the benefits of allocation folding (e.g., overhead reduction and elimination of write barriers) may outweigh any performance impacts resulting from memory fragmentation caused by allocation folding over (across) basic blocks.

In approaches where memory fragmentation from allocation folding gives rise to uninitialized memory regions between objects in the heap, the garbage collector should be capable of handling a non-iterable heap. For instance, a mark-and-sweep garbage collector can be used to store mark bits (for fragmented sections of memory) outside objects.

FIG. 5C is a block diagram 575 corresponding with FIG. 5A that illustrates an approach for applying dynamic allocation folding over basic blocks, such as using the techniques discussed above with respect to FIG. 4 (with further reference to FIG. 2A). Such an approach can avoid the memory fragmentation associated with allocation folding over basic blocks (which can be referred to as static allocation folding), as illustrated by, and discussed above with respect to FIG. 5B.

Presuming again, for purposes of this example, that a marking invariant for allocation folding is not violated between any of these four ALLOC instructions (e.g., the ALLOC instruction I1 would be the dominator of ALLOC instructions I2, I3 and I4), and that pointer consistency will not be violated, the ALLOC instructions I2, I3 and I4 may be folded into the ENSURESPACE instruction N1, as shown in basic block 510 in FIG. 5C. As shown in the diagram 575 of FIG. 5C, the size of a memory block associated with the ENSURESPACE instruction N1 is equal to the sum of the sizes of the ALLOC instructions I1, I2, I2, I4 of FIG. 5A. Further, as illustrated in FIG. 5C, the ALLOC instructions I1, I2, I2, I4 of FIG. 5A can be replaced by respective BUMPPOINTER instructions N2, N3, N4 and N5. In other implementations, if a marking invariant for dominance is violated between any two ALLOC instructions or pointer consistency could be violated, multiple dynamic allocation foldings may be implemented using local transformation of the compiled code (set of software instructions) using the techniques described herein.

Such an approach, as illustrated in FIG. 5C, may not cause memory fragmentation as a result of allocation folding because the ENSURESPACE instruction does not allocate memory, but only ensures a memory block of the requested size is available. In such implementations, the BUMPPOINTER instructions may cause the memory objects to be allocated (without the need for write barriers due to the determined dominance of the ENSURESPACE instruction). Therefore, only the memory objects along the execution path (taken branches) will be defined (carved out or allocated) in the memory block corresponding with the ENSURESPACE instruction N1 in FIG. 5C.

In one implementation, a computer-implemented method for compilation of applications can include receiving, by a software compiler implemented on a computing device, a set of software instructions and traversing, by the software compiler, the set of software instructions based on a control-flow order of the set of software instructions. The traversing can include identifying a first allocation instruction in the set of software instructions, the first allocation instruction being configured to allocate a first amount of memory for a first object and identifying a second allocation instruction in the set of software instructions, the second allocation instruction being configured to allocate a second amount of memory for a second object. The computer-implemented method can further include determining that the first allocation instruction dominates the second allocation instruction and in response to the determining, combining the first allocation instruction and the second allocation instruction into a folded allocation instruction that is configured to allocate the first amount of memory and the second amount of memory in a single memory allocation operation.

Example implementations can include one or more of the following features. For instance, the computer-implemented method can include replacing the second allocation instruction with an instruction to define the second object in the memory of the single memory allocation operation. The instruction to define the second object can be an INNER instruction that is configured to define the second object in a block of memory corresponding with the single memory allocation.

The traversing can include identifying a third allocation instruction in the set of software instructions, the third allocation instruction being configured to allocate a third amount of memory for a third object, where the method can include determining that the first allocation instruction dominates the third allocation instruction. In response to the determining that the first allocation instruction dominates the third allocation instruction, the combining can include combining the third allocation instruction with the first allocation instruction and the second allocation instruction in the folded allocation instruction. The folded allocation instruction can be configured to allocate the third amount of memory in the single memory allocation operation. The computer-implemented method can include replacing the third allocation instruction with an instruction to define the third object in the memory of the single memory allocation operation. The single memory allocation operation can allocate the first amount of memory, the second amount of memory and the third amount of memory in a contiguous memory block.

The first allocation instruction, the second allocation instruction and the third allocation instruction can be included in a single block of sequential code. The first allocation instruction can be included in a first block of sequential code, the second allocation instruction can included in a second block of sequential code that is sequential with the first block of sequential code and the third allocation instruction can be included in a third block of sequential code that is sequential with the first block of sequential code and parallel with the second block of sequential code.

The traversing can include identifying a fourth allocation instruction in the set of software instructions, the fourth allocation instruction being configured to allocate a fourth amount of memory for a fourth object. The method can include determining that the first allocation instruction dominates the fourth allocation instruction. In response to the determining that the first allocation instruction dominates the fourth allocation instruction, the combining can include combining the fourth allocation instruction with the first allocation instruction, the second allocation instruction and the third allocation instruction in the folded allocation instruction, where the folded allocation instruction can be further configured to allocate the fourth amount of memory in the single memory allocation operation.

The first allocation instruction can be included in a first block of sequential code, the second allocation instruction can be included in a second block of sequential code that is sequential with the first block of sequential code, the third allocation instruction can be included in a third block of sequential code that is sequential with the first block of sequential code and parallel with the second block of sequential code and the fourth allocation instruction can be included in a fourth block of sequential code that is sequential with the second block of sequential code and sequential with the third block of sequential code. The computer-implemented method can include replacing the fourth allocation instruction with an instruction to define the fourth object in the memory of the single memory allocation operation.

The single memory allocation operation can allocate the first amount of memory and the second amount of memory in a contiguous memory block. The computer-implemented method can include replacing the first allocation instruction with an instruction to define the first object in the memory of the single memory allocation operation. The folded allocation instruction can be a first folded allocation instruction and the single memory allocation operation can be a first single memory allocation operation, where the traversing can include identifying a third allocation instruction in the set of software instructions The third allocation instruction can be configured to allocate a third amount of memory for a third object. The computer-implemented method can include identifying a fourth allocation instruction in the set of software instructions. The fourth allocation instruction can be configured to allocate a fourth amount of memory for a fourth object. The computer-implemented method can include determining that the first allocation instruction does not dominate the third allocation instruction, determining that the third allocation instruction dominates the fourth allocation instruction and, in response to the determining that the third allocation instruction dominates the fourth allocation instruction, combining the third allocation instruction with the fourth allocation instruction in a second folded allocation instruction, the second folded allocation instruction being configured to allocate the third amount of memory and the fourth amount of memory in a second single memory allocation operation.

In another implementation, a computer-implemented method can include receiving, by a software compiler implemented on a computing device, a set of software instructions and traversing, by the software compiler, the set of software instructions based on a control-flow order of the set of software instructions. The traversing can include identifying a first allocation instruction in the set of software instructions, the first allocation instruction being configured to allocate a first amount of memory for a first object, and identifying a second allocation instruction in the set of software instructions, the second allocation instruction being configured to allocate a second amount of memory for a second object. The method can also include determining that the first allocation instruction dominates the second allocation instruction and, in response to the determining, can include inserting, in the set of software instructions, an instruction before the first allocation instruction. The inserted instruction can be configured to determine if a contiguous memory block of sufficient size to allocate the first amount of memory and the second amount of memory is available and, if the contiguous memory block of sufficient size is not available, trigger garbage collection. The computer-implemented method can also include replacing the first allocation instruction with an instruction configured to allocate the first amount of memory in the contiguous memory block and replacing the second allocation instruction with an instruction configured to allocate the second amount of memory in the contiguous memory block.

Example implementations can included one or more of the following features. For instance, the traversing can include identifying a third allocation instruction in the set of software instructions, the third allocation instruction being configured to allocate a third amount of memory for a third object. The determining that the first allocation instruction dominates the second allocation instruction can include determining that the first allocation instruction dominates the third allocation instruction. The determining if the contiguous memory block of sufficient size is available can include determining if a contiguous memory block of sufficient size to allocate the first amount of memory, the second amount of memory and the third amount of memory is available. The computer-implemented method can include replacing the third allocation instruction with an instruction configured to allocate the third amount of memory in the contiguous memory block.

In another implementation, a non-transitory recordable storage medium can have instructions recorded and stored thereon for implementing a software compiler, the instructions, when executed by a computing device, can cause the computing device to receive a set of software instructions and traverse the set of software instructions based on a control-flow order of the set of software instructions. The traversing can include identifying a first allocation instruction in the set of software instructions, the first allocation instruction being configured to allocate a first amount of memory for a first object, and identifying a second allocation instruction in the set of software instructions, the second allocation instruction being configured to allocate a second amount of memory for a second object. The instructions, when executed by the computing device, can also cause the computing device to determine that the first allocation instruction dominates the second allocation instruction and, in response to the determining, combine the first allocation instruction and the second allocation instruction into a folded allocation instruction that is configured to allocate the first amount of memory and the second amount of memory in a single memory allocation operation.

Example implementations can include one or more of the following features. For instance, the instructions, when executed by the computing device, can further cause the computing device to identify a third allocation instruction in the set of software instructions, the third allocation instruction being configured to allocate a third amount of memory for a third object and determine that the first allocation instruction dominates the third allocation instruction. In response to the determining that the first allocation instruction dominates the third allocation instruction, the combining can include combining the third allocation instruction with the first allocation instruction and the second allocation instruction in the folded allocation instruction, the folded allocation instruction being configured to allocate the third amount of memory in the single memory allocation operation.

The folded allocation instruction can be a first folded allocation instruction and the single memory allocation operation can be a first single memory allocation operation. The instructions, when executed by the computing device, can cause the computing device to identify a third allocation instruction in the set of software instructions, the third allocation instruction being configured to allocate a third amount of memory for a third object, identify a fourth allocation instruction in the set of software instructions, the fourth allocation instruction being configured to allocate a fourth amount of memory for a fourth object, determine that the first allocation instruction does not dominate the third allocation instruction, determine that the third allocation instruction dominates the fourth allocation instruction, and, in response to the determining that the third allocation instruction dominates the fourth allocation instruction, combine the third allocation instruction with the fourth allocation instruction in a second folded allocation instruction, the second folded allocation instruction being configured to allocate the third amount of memory and the fourth amount of memory in a second single memory allocation operation.

In another implementation, a non-transitory recordable storage medium can have instructions recorded and stored thereon for implementing a software compiler, the instructions, when executed by a computing device, can cause the computing device to receive a set of software instructions and traverse the set of software instructions based on a control-flow order of the set of software instructions. The traversing can include identifying a first allocation instruction in the set of software instructions, the first allocation instruction being configured to allocate a first amount of memory for a first object and identifying a second allocation instruction in the set of software instructions, the second allocation instruction being configured to allocate a second amount of memory for a second object. The instructions, when executed by the computing device, can further cause the computing device to determine that the first allocation instruction dominates the second allocation instruction and, in response to the determining, insert, in the set of software instructions, an instruction before the first allocation instruction, the inserted instruction being configured to determine if a contiguous memory block of sufficient size to allocate the first amount of memory and the second amount of memory is available and, if the contiguous memory block of sufficient size is not available, trigger garbage collection. The instructions, when executed by a computing device, can further cause the computing device to replace the first allocation instruction with an instruction configured to allocate the first amount of memory in the contiguous memory block and replace the second allocation instruction with an instruction configured to allocate the second amount of memory in the contiguous memory block.

Figure 6:
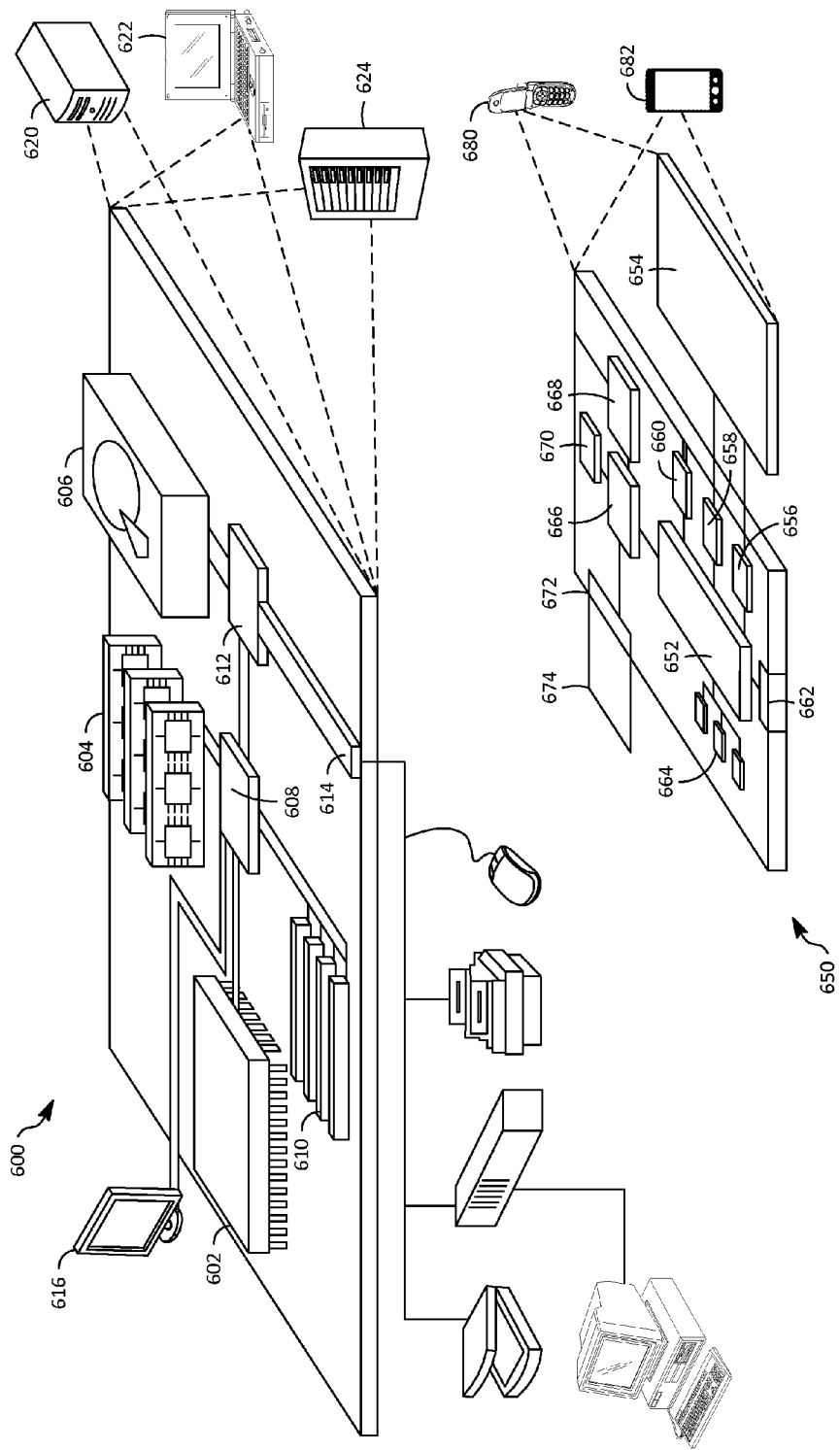
FIG. 6 is a diagram that illustrates an example of a computer device and a mobile computer device that can be used to implement the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, by a software compiler implemented on a computing device, a set of software instructions;
   traversing, by the software compiler, the set of software instructions based on a control-flow order of the set of software instructions, the traversing including:
      identifying a first allocation instruction in the set of software instructions, the first allocation instruction being configured to allocate a first amount of memory for a first object; and
      identifying a second allocation instruction in the set of software instructions, the second allocation instruction being configured to allocate a second amount of memory for a second object;
   determining that the first allocation instruction dominates the second allocation instruction; and
   in response to the determining, combining the first allocation instruction and the second allocation instruction into a folded allocation instruction that is configured to allocate the first amount of memory plus the second amount of memory in a single memory allocation operation.

2. The computer-implemented method of claim 1, further comprising:
   replacing the second allocation instruction with an instruction to define the second object in the memory of the single memory allocation operation.

3. The computer-implemented method of claim 2, wherein the instruction to define the second object is an INNER instruction is configured to define the second object in a block of memory corresponding with the single memory allocation.

4. The method of claim 1, wherein the traversing further includes:
   identifying a third allocation instruction in the set of software instructions, the third allocation instruction being configured to allocate a third amount of memory for a third object,
   the method further including determining that the first allocation instruction dominates the third allocation instruction, and
   in response to the determining that the first allocation instruction dominates the third allocation instruction, the combining further includes combining the third allocation instruction with the first allocation instruction and the second allocation instruction in the folded allocation instruction, the folded allocation instruction being further configured to allocate the third amount of memory in the single memory allocation operation.

5. The computer-implemented method of claim 4, further comprising:
   replacing the third allocation instruction with an instruction to define the third object in the memory of the single memory allocation operation.

6. The computer-implemented method of claim 4, wherein the single memory allocation operation allocates the first amount of memory, the second amount of memory and the third amount of memory in a contiguous memory block.

7. The computer-implemented method of claim 4, wherein the first allocation instruction, the second allocation instruction and the third allocation instruction are included in a single block of sequential code.

8. The computer-implemented method of claim 4, wherein:
the first allocation instruction is included in a first block of sequential code;
the second allocation instruction is included in a second block of sequential code that is sequential with the first block of sequential code; and
the third allocation instruction is included in a third block of sequential code that is sequential with the first block of sequential code and parallel with the second block of sequential code.

9. The method of claim 4, wherein the traversing further includes:
identifying a fourth allocation instruction in the set of software instructions, the fourth allocation instruction being configured to allocate a fourth amount of memory for a fourth object,
the method further including determining that the first allocation instruction dominates the fourth allocation instruction, and
in response to the determining that the first allocation instruction dominates the fourth allocation instruction, the combining further includes combining the fourth allocation instruction with the first allocation instruction, the second allocation instruction and the third allocation instruction in the folded allocation instruction, the folded allocation instruction being further configured to allocate the fourth amount of memory in the single memory allocation operation.

10. The computer-implemented method of claim 9, wherein:
the first allocation instruction is included in a first block of sequential code;
the second allocation instruction is included in a second block of sequential code that is sequential with the first block of sequential code;
the third allocation instruction is included in a third block of sequential code that is sequential with the first block of sequential code and parallel with the second block of sequential code; and
the fourth allocation instruction is included in a fourth block of sequential code that is sequential with the second block of sequential code and sequential with the third block of sequential code.

11. The computer-implemented method of claim 9, further comprising:
replacing the fourth allocation instruction with an instruction to define the fourth object in the memory of the single memory allocation operation.

12. The computer-implemented method of claim 1, wherein the single memory allocation operation allocates the first amount of memory and the second amount of memory in a contiguous memory block.

13. The computer-implemented method of claim 1, further comprising:
replacing the first allocation instruction with an instruction to define the first object in the memory of the single memory allocation operation.

14. The computer-implemented method of claim 1, wherein the folded allocation instruction is a first folded allocation instruction, the single memory allocation operation is a first single memory allocation operation,
the traversing further including:
identifying a third allocation instruction in the set of software instructions, the third allocation instruction being configured to allocate a third amount of memory for a third object; and
identifying a fourth allocation instruction in the set of software instructions, the fourth allocation instruction being configured to allocate a fourth amount of memory for a fourth object,
the method further including:
determining that the first allocation instruction does not dominate the third allocation instruction;
determining that the third allocation instruction dominates the fourth allocation instruction; and
in response to the determining that the third allocation instruction dominates the fourth allocation instruction, combining the third allocation instruction with the fourth allocation instruction in a second folded allocation instruction, the second folded allocation instruction being configured to allocate the third amount of memory and the fourth amount of memory in a second single memory allocation operation.

15. A computer-implemented method comprising:
receiving, by a software compiler implemented on a computing device, a set of software instructions;
traversing, by the software compiler, the set of software instructions based on a control-flow order of the set of software instructions, the traversing including:
identifying a first allocation instruction in the set of software instructions, the first allocation instruction being configured to allocate a first amount of memory for a first object; and
identifying a second allocation instruction in the set of software instructions, the second allocation instruction being configured to allocate a second amount of memory for a second object;
determining that the first allocation instruction dominates the second allocation instruction; and
in response to the determining:
inserting, in the set of software instructions, an instruction before the first allocation instruction, the inserted instruction being configured to:
determine if a contiguous memory block of sufficient size to allocate the first amount of memory and the second amount of memory is available; and
if the contiguous memory block of sufficient size is not available, triggering garbage collection;
replacing the first allocation instruction with an instruction configured to allocate the first amount of memory in the contiguous memory block; and
replacing the second allocation instruction with an instruction configured to allocate the second amount of memory in the contiguous memory block.

16. The computer-implemented method of claim 15, wherein:
the traversing further includes identifying a third allocation instruction in the set of software instructions, the third allocation instruction being configured to allocate a third amount of memory for a third object,
the determining that the first allocation instruction dominates the second allocation instruction further includes determining that the first allocation instruction dominates the third allocation instruction, the determining if the contiguous memory block of sufficient size is available further includes determining if a contiguous memory block of sufficient size to allocate the first amount of memory, the second amount of memory and the third amount of memory is available, and the method further comprises replacing the third allocation instruction with an instruction configured to allocate the third amount of memory in the contiguous memory block.

17. A non-transitory recordable storage medium having instructions recorded and stored thereon for implementing a software compiler, the instructions, when executed by a computing device, cause the computing device to:

receive a set of software instructions;

traverse the set of software instructions based on a control-flow order of the set of software instructions, the traversing including:

identify a first allocation instruction in the set of software instructions, the first allocation instruction being configured to allocate a first amount of memory for a first object; and identify a second allocation instruction in the set of software instructions, the second allocation instruction being configured to allocate a second amount of memory for a second object;

determine that the first allocation instruction dominates the second allocation instruction; and in response to the determining, combine the first allocation instruction and the second allocation instruction into a folded allocation instruction that is configured to allocate the first amount of memory plus the second amount of memory in a single memory allocation operation.

18. The non-transitory recordable storage medium of claim 17, wherein, the instructions, when executed by the computing device, further cause the computing device to:

identify a third allocation instruction in the set of software instructions, the third allocation instruction being configured to allocate a third amount of memory for a third object; and determine that the first allocation instruction dominates the third allocation instruction, and in response to the determining that the first allocation instruction dominates the third allocation instruction, the combining further includes combining the third allocation instruction with the first allocation instruction and the second allocation instruction in the folded allocation instruction, the folded allocation instruction being further configured to allocate the third amount of memory in the single memory allocation operation.

19. The non-transitory recordable storage medium of claim 17, wherein the folded allocation instruction is a first folded allocation instruction, the single memory allocation operation is a first single memory allocation operation, and the instructions, when executed by the computing device, further cause the computing device to:

identify a third allocation instruction in the set of software instructions, the third allocation instruction being configured to allocate a third amount of memory for a third object;

identify a fourth allocation instruction in the set of software instructions, the fourth allocation instruction being configured to allocate a fourth amount of memory for a fourth object;

determine that the first allocation instruction does not dominate the third allocation instruction;

determine that the third allocation instruction dominates the fourth allocation instruction; and in response to the determining that the third allocation instruction dominates the fourth allocation instruction, combine the third allocation instruction with the fourth allocation instruction in a second folded allocation instruction, the second folded allocation instruction being configured to allocate the third amount of memory and the fourth amount of memory in a second single memory allocation operation.

20. A non-transitory recordable storage medium having instructions recorded and stored thereon for implementing a software compiler, the instructions, when executed by a computing device, cause the computing device to:

receive a set of software instructions;

traverse the set of software instructions based on a control-flow order of the set of software instructions, the traversing including:

identifying a first allocation instruction in the set of software instructions, the first allocation instruction being configured to allocate a first amount of memory for a first object; and identifying a second allocation instruction in the set of software instructions, the second allocation instruction being configured to allocate a second amount of memory for a second object;

determine that the first allocation instruction dominates the second allocation instruction; and in response to the determining:

insert, in the set of software instructions, an instruction before the first allocation instruction, the inserted instruction being configured to:

determine if a contiguous memory block of sufficient size to allocate the first amount of memory and the second amount of memory is available; and if the contiguous memory block of sufficient size is not available, trigger garbage collection;

replace the first allocation instruction with an instruction configured to allocate the first amount of memory in the contiguous memory block; and replace the second allocation instruction with an instruction configured to allocate the second amount of memory in the contiguous memory block.

* * * * *